US006124018A

United States Patent [19]
Yoshino

[11] Patent Number: 6,124,018
[45] Date of Patent: Sep. 26, 2000

[54] MASKING FILM ROLL FOR USE IN PAINTING, METHOD FOR PRODUCING IT, AND TUBULAR FILM ROLL FROM WHICH IT IS PRODUCED

[75] Inventor: Takashi Yoshino, Hachioji, Japan

[73] Assignee: Yoshino Kasei Company Limited, Tokyo, Japan

[21] Appl. No.: 08/955,492

[22] Filed: Oct. 22, 1997

Related U.S. Application Data

[62] Division of application No. 08/584,143, Jan. 11, 1996, Pat. No. 5,741,389.

[51] Int. Cl.[7] .................................. B05D 1/32; B32B 3/04

[52] U.S. Cl. .......................... 428/122; 118/504; 118/505; 206/389; 206/813; 428/121; 428/192; 428/194; 428/904.4; 428/906

[58] Field of Search ................................ 428/40.1, 42.1, 428/192, 194, 906, 904.4, 121, 122; 118/504, 505; 206/389, 813

[56] References Cited

U.S. PATENT DOCUMENTS

| | | | |
|---|---|---|---|
| 4,263,347 | 4/1981 | Banta | 428/906 |
| 4,781,957 | 11/1988 | Brown | 428/43 |
| 5,113,921 | 5/1992 | Pool | 156/71 |
| 5,296,170 | 3/1994 | Noritsugu et al. | 264/22 |

FOREIGN PATENT DOCUMENTS

| | | |
|---|---|---|
| 61-24412 | 6/1986 | Japan . |
| 03042066 | 2/1991 | Japan . |
| 3-42066 | 2/1991 | Japan . |
| 07008857 | 1/1995 | Japan . |
| 08108474 | 4/1996 | Japan . |
| 2242858A | 10/1991 | United Kingdom . |
| 2200359A | 8/1996 | United Kingdom . |

*Primary Examiner*—Nasser Ahmad
*Attorney, Agent, or Firm*—Nath & Associates; Gary M. Nath; Harold L. Novick

[57] ABSTRACT

The invention provides an on-line continuous method for producing a masking film roll to be used in painting, comprising corona-discharging the inner surface of a tubular film of a polyolefinic resin, cutting the tubular film open, folding the film in the lengthwise direction in a particular manner, partly attaching an adhesive tape to the film along its lengthwise one edge in such a manner that the adhesive surface of the tape is made to face the corona-discharged surface of the film and that the thus-attached tape is left to have a non-attached part in its lengthwise direction, and winding up the film around a tubular core to be a roll, provides the masking film roll as produced by the method in which the adhesive surface of the adhesive tape attached to thereto faces opposite to the non-corona-discharged surface of the uppermost layer of the folded film, and provides a tubular film of a polyolefinic resin from which the masking film of the invention is produced and of which the inner surface has been corona-discharged.

2 Claims, 2 Drawing Sheets

MASKING FILM ROLL FOR USE IN PAINTING, METHOD FOR PRODUCING IT, AND TUBULAR FILM ROLL FROM WHICH IT IS PRODUCED

This application is a divisional application of U.S. patent application Ser. No. 08/584,143, filed Jan. 11, 1996, now U.S. Pat. No. 5,741,399 the entire contents of which are hereby incorporated in their entirety.

BACKGROUND OF THE INVENTION

1. Field of the Invention

The present invention relates to a masking film roll for use in painting, a method for producing it, and a tubular film from which it is produced. Precisely, the masking film roll for use in painting of the present invention is produced from a tubular film, of which the inner surface has been corona-discharged, and is widely utilized in painting constructions, pavements, airports, sports grounds, floors, walls, cars, ships, airplanes, vehicles, machines, office supplies, sports goods, amusement goods, leisure goods, displays, toys, woodwork, household articles, etc.

2. Prior Art

Various paintings are applied to many kinds of constructions, pavements, sports grounds, car parks, cars, vehicles and other various articles in order to make them have good appearance or to put thereon marks, ruled signs and illustrations. To attain such paintings, an area not to be painted with a coating material is previously masked with paper, synthetic paper, non-woven fabric, plastic film or the like by which it is easily separated from an area to be be painted. Accordingly, any direct application of a coating material to the surface of the area not to be painted therewith is prevented, and even when the coating material that has been applied to the area to be painted migrates to the area that shall not be painted, it is not in direct contact with the latter but is blocked by the paper, synthetic paper, non-woven fabric, plastic film or the like that has covered the area not to be painted. In this manner, the area that shall not be painted with a coating material is shielded and protected from being painted with the material. The above-mentioned paper and other films capable of exhibiting this function are referred to as masking films.

Various types of masking films have heretofore been employed, depending on the shape of the substance to be painted, the area to be painted, the properties of the coating material to be used, the temperature at which the coated material is baked, the temperature at which the coated material is dried, etc. The masking film to be provided by the present invention is intended to be directed to relatively large-sized paintings where the area to be painted is large and the area not to be painted (the area to be masked) is also large. In such paintings, the masking film need not always have the ability to adhere to or to temporarily adhere to the part to be not painted (the part to be masked) but needs to be such that, if a coating material has once been brought into contact with the surface of the masking film, it can firmly stick thereto with ease and therefore hardly runs thereon, and even after the coating material thus stuck to the masking film has been dried, it does not peel off from the surface of the film.

As the masking material of this type, paper, polyolefins and the like have been most popularly used in view of their costs and properties. However, paper is problematic in that its softness, water-proofness and solvent resistance are unsatisfactory, it is not easy to handle, it is not transparent and its mechanical strength is poor. For these reasons, the use of polyolefins that are free from such drawbacks in paper is increasing in place of paper.

One typical method of producing a masking film from a polyolefin film comprises, for example, inflating a high-density polyethylene having a density of from 0.94 to 0.97 g/ml, a melt index of from 0.05 to 0.8 g/10 min and a melt tension of 5 g or more into a film at an extrusion temperature of from 170 to 210° C. and at a blow rate of from 1:2 to 1:5 to have a frost line of from 200 to 800 mm, taking up it at a taking-up speed of from 10 to 200 m/min to be a tubular film having a thickness of from 5 to 20 $\mu$m, conveying it in the lengthwise direction in order while applying thereto a thin metal cutter at one site of the film to thereby make the film have a break in the lengthwise direction, then flattening the film with rollers, rotating one edge of the film, along which it has been cut, by 180 degrees around the lengthwise direction of the right-handed end or the left-handed end of the film as the rotation axis to thereby make the inner surface of the film face upside, then sticking an adhesive tape on the film along one edge thereof in the lengthwise direction in such a way that the adhesive tape is made to partly overlap with the edge of the film, and finally winding up the film around a paper tube into a roll.

However, since the surface of the masking film thus produced according to the method mentioned above is inactive, the components constituting a coating material do not easily adhere thereto. In particular, when the masking film is used while being attached to the perpendicular surface of a substance to be painted, the coating components that have scattered onto the masking film will run down to soil the surface of the floor to thereby worsen the working environment while those that have adhered to the surface of the film easily peel off therefrom, after having been dried thereon, to scatter around the floor to further worsen the working environment. For these reasons, the masking film is unfavorable.

On the other hand, one prior art technique of improving such a masking film has been disclosed in Japanese Patent Application Laid-Open No. Hei 3-42066 (JP-A 3-42066), by which a flat polyolefin film is subjected to corona-discharging to enhance the affinity of the treated surface of the film with a coating material. According to this technique, it is said that coating components can easily adhere to the surface of the film and therefore hardly peel off therefrom. Since the masking film to be produced from a polyolefin tubular film such as that mentioned above has been corona-discharged, it may exhibit the above-mentioned effects in some degree and has already been commercialized. Referring to Example 1 in the specification of the publication, the masking film is produced by "flattening a tubular film with pinch rollers and subjecting the flattened film to corona-discharging in air just before winding up it around a winding-up roll, whereupon the conditions for the corona-discharging to be conducted by the use of a corona-discharging device of HFSS-101 Model ex Kasuga Electric Co. are such that the electrode-film distance is from 2 to 3 mm". The corona-discharging employed is an ordinary one that has heretofore been applied to polyolefin tubular films, by which it is obvious that only the outer surface of the tubular film is corona-discharged but the inner surface thereof is not influenced at all.

The present inventor has actually produced a masking film according to the method disclosed in the above-mentioned Japanese Patent Application Laid-Open No. Hei 3-42066 and have found that the method as well as the product produced according to the method have various problems. First, according to the method, a tubular film is flattened, then the outer surface of the thus-flattened film is subjected to corona-discharging, the film is cut open to be an open flat film, and an adhesive tape having a width of 15 mm is lengthwise laminated onto the corona-discharged surface of the film in such a way that a part (having a width of about 4 mm) of the adhesive layer of the tape may lengthwise overlap with the corona-discharged surface of the film by passing the film along with the tape between rollers. The film thus produced is not folded in the widthwise direction before packaging orrolling it for commercial sale. If the film is narrow, it may be directly rolled into a roll film without involving any problem in bulkiness. However, such a narrow masking film is in little demand but wide masking films having a width of from 20 to 250 cm and capable of covering large area are in great demand.

If a wide film is produced according to the method disclosed in Japanese Patent Application Laid-Open No. Hei 3-42006, it shall be rolled as it is wide. Therefore, the width of the resulting roll film is large so that the space for storing the roll films shall be large. In addition, the operation for sticking the adhesive layer part of the masking film on the surface to be masked with the film is difficult, and, after a part of the film has been stuck on the surface to be masked therewith, the operation for tearing off the excessive film by hand is also difficult. In order to solve these problems, the film shall not be handled with open width but shall be folded plural times in parallel in the lengthwise direction before use. After having been thus folded, the film was made to be free from the drawback in the large width thereof. However, the adhesive surface of the adhesive tape as adhered to the masking film is on the same plane as the corona-discharged surface of the film that is positioned along the edge of the tape in the widthwise direction as seen from the adhered part of the tape, though there is a distance of several centimeters therebetween. Therefore, while the masking film roll is unrolled and is applied to a substance to be masked therewith, the edge of the corona-discharged film being unrolled is trailed by the adhesive tape along its adhesive surface. For these reasons, the operation of unrolling and applying the masking film to the substance to be masked therewith is extremely difficult.

In order to evade this trouble, the tubular film is cut open after its outer surface has been corona-discharged, then the film is turned upside down in order that the corona-discharged surface of the film is made to face inside while the non-corona-discharged surface thereof is to face outside, thereafter the film is folded in parallel in the lengthwise direction in the same manner as above, and an adhesive tape is stuck on the corona-discharged surface of the film along its edge. If so, the adhesive surface of the adhesive tape is prevented from being positioned adjacent to and on the same plane as the non-corona-discharged surface of the masking film along the opposite edge of the film, but the non-corona-discharged surface of the film can be positioned in the opposite side to the adhesive surface of the tape in such a way that the non-corona-discharged surface of the film faces outside. Therefore, when the masking film having an adhesive tape in this manner is applied to the surface of a substance to be masked therewith, the edge of the film is prevented from being trailed by the adhesive tape.

As has been described hereinabove, the up-to-date prior art technique for producing a compact masking film roll from a polyolefin is such that a tubular film is first made from a polyolefin, its surface is corona-discharged, the tubular film is then cut open and then turned upside down, then the film is folded several times in the lengthwise direction, and an adhesive tape is stuck on the film in such a way that the adhesive surface of the tape is made to face the corona-discharged surface of the film. The handleability of the masking film to be produced according to the prior art technique mentioned above is good. However, the process itself for producing the masking film is extremely complicated and therefore the masking film rolls to be produced according to the process could not be put to practical use in commercial base.

Given the situation as above, the subject matter of the present invention is to provide a method for economically and inexpensively producing a masking film roll that does not need any large space for storing it and that can easily be applied to a substance to be masked therewith, as well as the masking roll film itself to be produced according to the method, and also to provide a tubular film from which the masking film is produced.

SUMMARY OF THE INVENTION

Specifically, the present invention provides a method for producing a masking film roll to be used in painting, which comprises;

- a step 1 of inflating a polyolefinic resin to form a tubular film,
- a step 2 of bringing the outer surface of the tubular film into contact with at least a pair of electrodes to which is being applied a high-voltage current, while the tubular film is being run with having a gas therein and while the upper and lower sides of the inner surface of the tubular film are not stuck together but are separated from each other by a distance of from 1 to 7 mm due to the gas existing therebetween, whereby the inner surface of the tubular film is subjected to corona discharging to be able to have an elevated wetting tension of 40 dyn/cm or more,
- a step 3 of making the thus-corona-discharged tubular film have a break in the lengthwise direction while the film is being conveyed in order in the lengthwise direction,
- a step 4 of flattening the tubular film thus having the break therethrough, by means of rollers,
- a step 5 of turning by 180 degrees the upper part of the flattened film that exists in either the left-sided portion or the right-sided portion as separated by the break that has been imparted to the film in the previous step 3, around the left-sided or right-sided end of the film as seen in the lengthwise direction of the film as the rotation axis, thereby exposing the inner surface of the film outside,
- a step 6 of attaching an adhesive tape to the thus-exposed, corona-discharged surface of the film along the lengthwise edge of the film in such a way that the adhesive layer of the tape is made to face the corona-discharged surface of the film while the tape is left to be partly non-attached to the film,
- a step 7 of folding the film in parallel in the lengthwise direction and toward the corona-discharged surface thereof, and
- a step 8 of winding up the film as obtained in the step 7 around a tubular core.

As one preferred embodiment of the above-mentioned method of the present invention, the step 6 is conducted in such a way that the lengthwise right-sided or left-sided adhesive layer part having a width of from 2 to 15 mm of the adhesive tape having a width of from 3 to 20 mm is attached to the surface of the lengthwise left-sided or right-sided edge having a width of from 1 to 10 mm of the film while the remaining lengthwise left-sided or right-sided adhesive layer part therefore having a width of from 2 to 19 mm of the adhesive tape is left to be non-attached.

The present invention also provides a masking film roll to be produced according to the method mentioned above, which is characterized in that one lengthwise edge of the open-width film is positioned with the corona-discharged surface thereof being made to face upside, that the lengthwise edge of the film has an adhesive tape as lengthwise partly attached thereto in such a way that the adhesive surface of the tape is made to face the corona-discharged surface of the film, that the film is folded opposite to the adhesive surface of the tape at any desired site in the widthwise direction of the film and around the folding axis in the lengthwise direction of the film, and that the film with the thus-folded parts thereof being placed one upon another is wound up around a tubular core in the direction perpendicular to the lengthwise direction of the film into a roll.

One preferred embodiment of the masking film roll of the present invention mentioned above is such that a part of the open-width film, the lengthwise left-handed edge part having a width of from 2 to 20 mm of the film (hereinafter referred to as "2 to 20 mm-wide film part") is positioned with its corona-discharged surface being made to face upside, while the lengthwise right-handed edge part of the adhesive tape is attached to the edge part of the film with the adhesive surface of the tape being made to face the corona-discharged surface of the film, that a part of the open-width corona-discharged film having a width of from 10 to 140 cm, which exists in the right-handed side of the 2 to 20 mm-wide film part and continuous thereto as another part of the open-width film, is folded nearly at the center in the widthwise direction of the film around the folding axis in the lengthwise direction of the film, that the thus-folded film part having a width of from 5 to 70 cm is made to have its corona-discharged surface facing backward and is placed on the 2 to 20 mm-wide film part and also on the other film part that is right-handed and continuous to the 2 to 20 mm-wide film part with the corona-discharged surfaces of the both parts being made to face each other, that the thus-over laid film part is further folded for at least one gazette-like folding or for at least one rotary folding around the lengthwise direction of the film as the rotation axis, that the adhesive surface of the adhesive tape is positioned to face opposite to the non-corona-discharged surface of the 5 to 70 cm-wide folded film part, and that the film thus arranged is wound up around a tubular core in the direction perpendicular to the lengthwise direction of the film. In the preferred embodiment mentioned above, the tubular film is cut open and the resulting open-width film is rotated in the left-sided direction. However, such has been referred to herein only as a mere illustrative embodiment by which the technical content of the present invention can be easily understood, and is not whatsoever limitative. Needless-to-say, the open-width film may be rotated in the right-handed direction to attain the same effects as in the illustrated embodiment where the film is rotated in the left-handed direction.

In addition, the present invention further provides a tubular film from which a masking film to be used in painting is produced, the tubular film having been produced by inflation of a polyolefinic resin to have a thickness of from 5 to 40 $\mu$m and being characterized in that its inner surface has been corona-discharged to have a wetting tension of 40 dyn/cm or more.

DETAILED DESCRIPTION OF THE INVENTION

Figure 1:
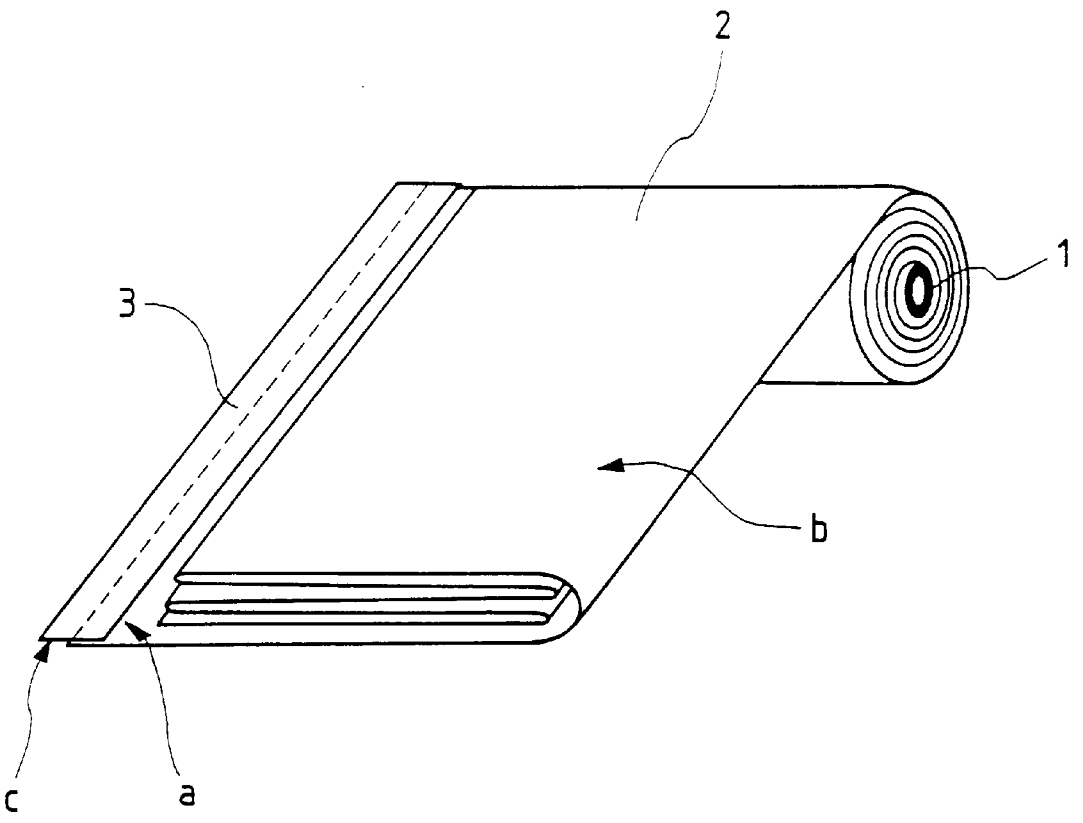
FIG. 1 is a perspective view showing the masking film roll as obtained in Example 1 of the present invention.

The polyolefinic resin for use in the present invention includes, for example, high-density polyethylenes, middle-density polyethylenes, high-pressure low-density polyethylenes, linear low-density ethylene-α-olefin copolymers, ethylene-vinyl acetate copolymers, ethylene-acrylate copolymers, polypropylenes, etc.

Of these, preferred are high-density polyethylenes as having high mechanical strength, easy widthwise tearability, easy handlability, easy workability, good heat resistance and good cold resistance. Above all, most preferred are high-density polyethylenes having a density of from 0.945 to 0.965 g/cm$^3$ and a melt index of from 0.03 to 1.5 g/10 min. The density as referred to herein is obtained according to JIS-K7112. Films of high-density polyethylenes having a density of lower than 0.945 g/cm$^3$ are not tough and are difficult to handle, while those having a density of more than 0.965 g/cm$^3$ are not also favorable since they are too easily torn due to the great difference between the lengthwise orientation and the widthwise orientation. The melt index as referred to herein is obtained according to JIS-K7210. High-density polyethylenes having a melt index of lower than 0.03 g/10 min cannot be formed into films by high-speed filming operation and therefore the producibility of films from these is poor, while those having a melt index of higher than 1.5 g/10 min shall have a too small viscosity and are therefore also unfavorable since the stability of their melts is poor.

The production of the tubular film by inflation in the step 1 of the method of the present invention may be conducted in any ordinary manner where a polyolefinic resin is extruded through a circular die at temperatures not lower than its melting point to give a tubular film while introducing air into the film, which is then cooled in air or water. Any desired condition may be applied to this, but it is desirable that the tubular film thus formed has a thickness of from 5 to 40 $\mu$m. This is because if the thickness is less than 5 $\mu$m, the film is not tough and is difficult to handle, but if it is more than 40 $\mu$m, the cost of the film increases and, in addition, the masking film roll to be produced from this is unfavorably too bulky.

The corona discharging of the inner surface of the tubular film in the step 2 of the method of the present invention may be conducted in such a manner that the outer surface of the film is brought into contact with at least a pair of electrodes, to which is being applied a high-voltage current, while the tubular film is being run with having therein a gas, such as air, nitrogen gas, argon gas, xenon gas, carbon dioxide or the like, and while the upper and lower sides of the inner surface of the tubular film are not stuck together but are separated from each other by a distance of from 1 to 7 mm due to the gas existing therebetween, whereby the inner surface of the tubular film is subjected to corona discharging to be able to have an elevated wetting tension of 40 dyn/cm or more.

As mentioned above, the inner surface of the tubular film of the present invention must be activated by the corona discharging as applied thereto to be able to have a wetting tension of 40 dyn/cm or more. If the wetting tension of the film is lower than 40 dyn/cm, the adhesion of a coating material to the surface (corona-discharged surface) of the film is poor with the result that the coating material as scattered onto the surface of the film easily runs thereon to often flow downward and that the coating material as adhered to the surface of the film easily peels off therefrom and scatters, after having been dried, to unfavorably worsen the working environment.

Most desirably, the inner surface of the tubular film of the present invention has a wetting tension of 45 dyn/cm or more.

Corona discharging has been disclosed in detail, for example, in Japanese Patent Publication No. Sho 61-24412 (JP-B 61-24412). Although the corona-discharging technique as disclosed therein is directed to the inner surface of a tubular film, the film is used only for packing meat therewith and the publication merely refers to the effect of the meat-packing film in that the meat as packed with the film is well airtightly sealed. The publication does not suggest at all the applicability of the tubular film to a masking film to be used in painting such as that of the present invention.

The tubular film, of which the inner surface has been corona-discharged in the manner as mentioned above, may be wound up around a tubular core such as a paper tube or the like to be a film roll or may be folded to have a suitable length as a final product, without being subjected to the next step. Therefore, the present invention also provides the tubular film as produced in the manner as mentioned above, from which a masking film to be used in painting is produced.

In the next step 3 of the present invention, the tubular film that has been corona-discharged in the previous step 2 is made to have a lengthwise break, while the film is being conveyed in order in the lengthwise direction, for example, by applying a thin metal cutter, laser rays, heat spots or the like to one site of the film, whereby the tubular film is cut open to a film strip.

The film thus having been cut open and flattened in the step 3 (film strip) is folded in parallel in the lengthwise direction in the step 7 to attain the masking film of the present invention. If the tubular film is directly pressed and partly cut open to be a final product, the product is too broad and therefore needs a large space for storing it. In addition, if such a broad film is used as a masking film in painting, it is difficult to handle. In order to evade such unfavorable troubles and to obtain compact products, the folding step 7 is indispensable in the method of the present invention. To fold the film, any of gazette-like folding, multiple folding and other folding means may be employed, but it is necessary that the film shall not be folded onto the non-corona-discharged surface thereof that is positioned at the same side as the adhesive surface of the adhesive tape as attached to the film. If the folded film is on the same side as the adhesive surface of the adhesive tape, a part of the film will be trailed by the adhesive tape, when the film is applied to the substance to be masked therewith via the adhesive tape. If so, the folded part of the masking film being used could no more be unfolded to be open.

The folding step 7 can be conducted directly after the step 4 or after the step 5 or 6.

In the step 5, the lengthwise left-sided or right-sided edge of the film as having been cut open in the previous step 3 is rotated by 180 degrees along the lengthwise side of the film as the rotation axis whereby the inner surface of the film is exposed outside. As a result of the step 5, the corona-discharged inner surface of the film is turned outside and it becomes possible to attach an adhesive tape to the lengthwise edge of the inner surface of the film.

In the present invention, the step of attaching an adhesive tape to the lengthwise left-handed or right-handed edge of the corona-discharged inner surface of the masking film in such a way that the adhesive layer of the tape is made to face the corona-discharged inner surface of the film while the lengthwise left-sided or right-sided edge of the tape is left to be non-attached is indispensable in order that the adhesive tape, via which the film is applied to a substance to be masked therewith in such a manner that the corona-discharged surface of the film is kept outside while the corona-non-discharged surface thereof is kept inside, is partly fixed to the film. Preferably, in this step, the lengthwise right-handed or left handed adhesive layer part having a width of from 2 to 15 mm of the adhesive tape having a width of from 3 to 20 mm is attached to the surface of the lengthwise left-sided or right-sided edge having a width of from 1 to 10 mm of the film while the remaining lengthwise left-sided or right-sided adhesive layer part therefore having a width of from 2 to 19 mm of the adhesive tape is left to be non-attached.

In the step 8 of the present invention of winding up the adhesive tape-attached film as obtained in the previous step 6 around a tubular core, the film is wound up into a compact film roll as the final product. The tubular core may be any of a paper tube, a plastic tube, a metal tube, a wood tube and the like. In view of the costs and the properties, a paper tube is preferred.

As has been described in detail in the above, the method for producing a masking film roll to be used for painting is novel in that the inner surface of a tubular film of a polyolefinic resin is continuously corona-discharged, that the tubular film is cut open and then folded in the lengthwise direction in a particular manner, that an adhesive tape is attached to the film along its lengthwise one edge in such a manner that the adhesive surface of the tape is made to face the corona-discharged surface of the film, that the film is then wound up around a tubular core to be a roll, and that these steps constitute a continuous on-line process. Accordingly, the method of the present invention is more simple and produces more easily the intended product than any other conventional method, and the costs for the former are lower than those for the latter.

Since the masking film roll thus produced according to the method of the present invention has a structure different from the structure of any other conventional masking film rolls, the masking ability of the former is superior to that of the latter in that a coating material can more easily adhere to the former without running thereon and that the coating material that has adhered to and dried on the former does not peel off therefrom. Moreover, the masking film roll of the present invention has extremely excellent handleability and workability, and it is possible to reduce the space for storing it.

In addition, the tubular film of the present invention can be formed into a masking film by simple operation of merely cutting it open followed by attaching an adhesive tape to one lengthwise edge of the film. The masking film thus produced from the tubular film of the present invention is surely free from the problem in its actual use in painting. Precisely, when the masking film is used in painting a substance by attaching it to the part of the substance that shall not be painted, the film is not trailed by the adhesive tape.

Moreover, the masking ability of the masking film to be produced from the tubular film of the present invention is excellent in that a coating material can easily adhere to the film without running thereon and that the coating material that has adhered to and dried on the film hardly peels off therefrom. Furthermore, the masking film has extremely excellent handleability and workability, and it is possible to reduce the space for storing it. The tubular film of the present invention, from which a masking film with such excellent handleability and workability can be produced, can be produced by a process comprising simple steps and the costs for producing the tubular film can be lowered.

When a particular high-density polyethylenes is used as the starting polyolefinic resin to be filmed according to the present invention, it is possible to obtain a tubular film to be able to be formed into a masking film having especially excellent mechanical characteristics, producibility and handlability.

In addition, when the inner surface of the tubular film of the present invention is made to have a wetting tension of 45 dyn/cm or more, the tubular film can be produced into a masking film having especially excellent masking characteristics.

EXAMPLES

Next, the present invention will be described in more detail by means of the following examples, which, however, are not intended to restrict the scope of the present invention.

Example 1

This is to demonstrate the production of a masking film of the present invention to be used in painting.

A high-density polyethylene having a density of 0.948 g/ml and a melt index of 0.06 g/10 min was extruded through a die at 190° C. and inflated at a blow rate of 4.5 and at a winding-up rate of 50 m/min, while cooling in air, to form a tubular film having a thickness of 10 μm and a lay flat width of 25 cm.

After having been filled with air and sealed to have an inner space of 2 mm, this was corona-discharged, using a corona discharger (ex Kasuga Electric Co.) as directed to the inner surface of the tubular film, to make its inner surface have a wetting tension of 45 dyn/cm.

A thin razor's edge was applied to the upper surface of the flattened, tubular film nearly at its center (since the lay flat width of the film is 25 cm, the razor's edge was applied to the site of 10 cm from the left-handed end of the film), by which the film was made to have a lengthwise break in parallel to the lengthwise direction of the film. Next, the upper part of the film existing in the left of the break was rotated by 180 degrees around the left side of the film as the rotation axis, whereby the corona-discharged inner surface of the part of the film was exposed outside.

A part (having a lengthwise width of 5 mm) of an adhesive tape having a width of 15 mm was attached to the corona-discharged inner surface of the part of the film along the lengthwise left-handed edge (having a width of 5 mm) thereof in such a way that the adhesive surface of the tape might face the corona-discharged inner surface of the film.

On the other hand, the other part of the film than the above-mentioned one was folded by repeated gazette folding and double folding to make it folded six times in such a way that the lowermost part of the folded film might be positioned opposite to the adhesive surface of the adhesive tape.

The film thus prepared in the manner as mentioned above was wound up around a paper tube having a length of 12 mm and a diameter of 2 cm to be a film roll of having of a diameter of 7 cm. Thus, a masking film roll to be used in painting was obtained.

FIG. 1 shows the film roll thus obtained, where one widthwise edge thereof has been partly unrolled. In FIG. 1, 1 is the paper tube, 2 is the film, 3 is the adhesive tape, and a, b and c are the corona-discharged surface of the film 1, the non-corona-discharged surface thereof, and the adhesive surface of the adhesive tape 3, respectively.

The film roll was tested with respect to the following matters, and the test results are mentioned below.

a. Handleability

The film roll was unrolled and stuck on a wood board as stood vertically, via the adhesive tape in such a manner that the adhesive tape might be horizontal in a length of 30 cm, and the remaining part of the film roll was torn off by hand. The film roll was small, as having a width of 12 cm and a diameter of 7 cm, and was easily caught in the palm of the hand. After having been attached to the wood board, the folded part of the film hung down due to its gravity to be opened flat. Thus, the handlability of the film roll was extremely good.

b. Adhesiveness of Coating Material

A red paint was applied to the surface of the film at a dry thickness of 20 μm, whereupon the paint uniformly adhered to the film without running down. After the paint had been dried, the masking film was peeled off from the wood board, whereupon the dried paint did not peel off from the film. In addition, the film with the paint was crumpled by hand but the paint did not steel peel off from the film.

Example 2

This is to demonstrate the production of a tubular film of the present invention.

A high-density polyethylene having a density of 0.952 g/ml and a melt index of 0.8 g/10 min was extruded through a die at 195° C. and inflated at a blow rate of 4.3 and at a winding-up rate of 55 m/min, while cooling in air, to form a tubular film having a thickness of 10 μm and a lay flat width of 30 cm.

After having been filled with air and sealed to have an inner space of 2 mm, this was corona-discharged, using a corona discharger (ex Kasuga Electric Co.) as directed to the inner surface of the tubular film, to make its inner surface have a wetting tension of 47 dyn/cm. Next, the film was flattened with rollers and then wound up around a paper tube having a diameter of 3 cm. Thus, a tubular film roll having a diameter of 30 cm was obtained.

Figure 2:
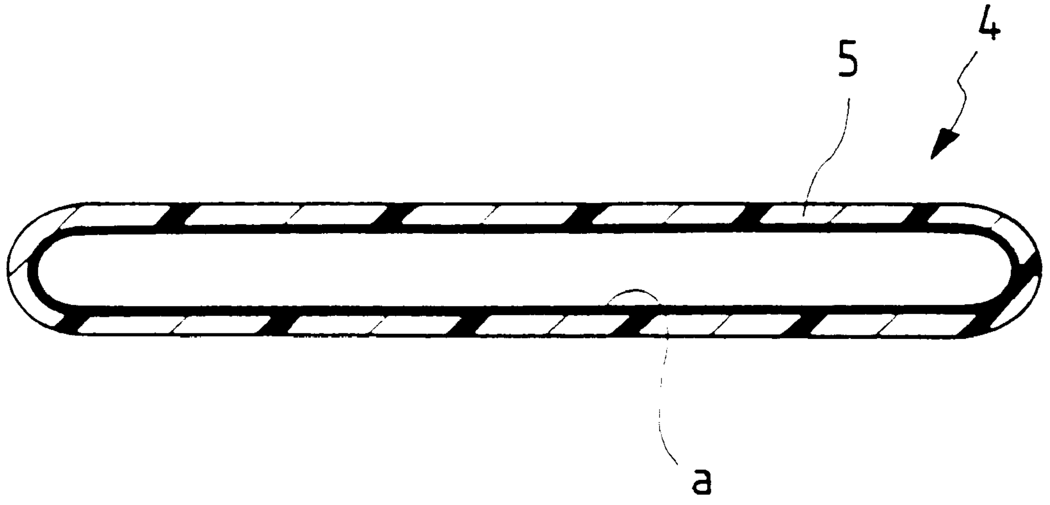
FIG. 2 is a widthwise cross-sectional view showing the tubular film as obtained in Example 2 of the present invention, from which a masking film to be used in painting is produced.
Figure 3:
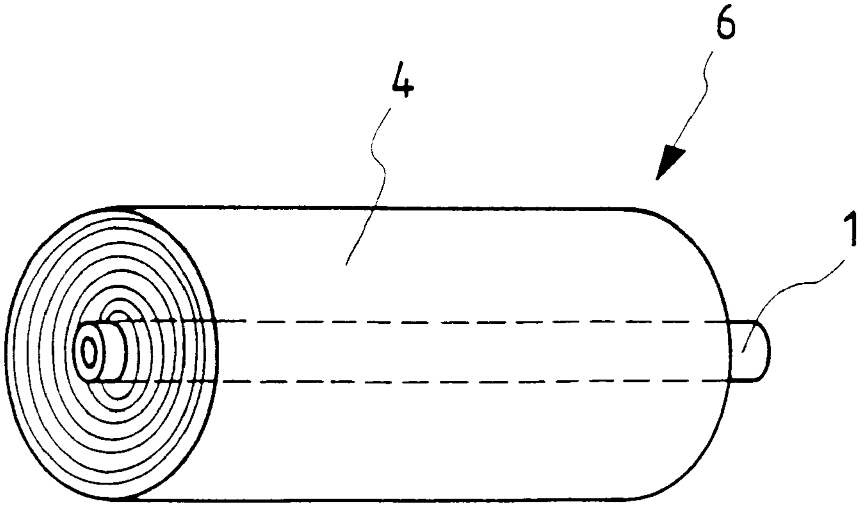
FIG. 3 is a perspective view showing the tubular film roll as obtained in Example 2 of the present invention, from which a masking film to be used in painting is produced.

FIG. 2 is a widthwise cross-sectional view showing the tubular film 4 which was corona-discharged but was not flattened. In FIG. 2, 5 is a film of a polyolefinic resin (in this example, this is a high-density polyethylene), and a is the corona-discharged inner surface of the film 5. FIG. 3 shows the tubular film roll 6 obtained herein, in which the film 4 was wound up around the paper tube 1.

While the invention has been described in detail and with reference to specific embodiments thereof, it will be apparent to one skilled in the art that various changes and modifications can be made therein without departing from the spirit and scope thereof.

What is claimed is:

1. A masking film roll to be used in painting comprising, an open-width film having a non-corona-discharged side and a corona-discharged side being entirely treated with corona discharge;

a lengthwise edge of the open-width film being positioned with the corona-discharged side thereof being made to face upside, the lengthwise edge of the film having an adhesive tape along the lengthwise edge so that the adhesive tape is partly attached to the lengthwise edge in such a way that the adhesive surface of the tape is made to face the corona-discharged side of the film, the film being folded opposite to the adhesive surface of the tape at any desired site in a widthwise direction of the film and around the folding axis in the lengthwise direction of the film, and that the film with the thus-folded parts thereof being placed one upon another is wound up around a tubular core in the direction perpendicular to the lengthwise direction of the film into a roll.

2. The masking film roll as claimed in claim 1, wherein a lengthwise left-handed edge part having a width of from 2 to 20 mm of the film being positioned with its corona-discharged side being made to face upside, while a lengthwise right-handed edge part of the adhesive tape is attached to the edge part of the film with an adhesive surface of the tape being made to face the corona-discharged side of the film, wherein a part of the open-width corona-discharged film having a width of from 10 to 140 cm, which exists in the right-handed side of the left-handed edge part and continuous thereto as an other part of the open-width film, is folded nearly at the center in the widthwise direction of the film around the folding axis in the lengthwise direction of the film forming a thus-folded film part, wherein the thus-folded film part having a width of from 5 to 70 cm is made to have its corona-discharged side facing backward and is placed on the left handed edge part and also on the other film part that is right-handed and continuous to the left handed edge part with the corona-discharged side of the both parts being made to face each other, wherein the thus-overlaid film part is further folded in the same direction or for at least one rotary folding around the lengthwise direction of the film as the rotation axis, wherein the adhesive surface of the adhesive tape is positioned to face opposite to the non-corona-discharged side of the 5 to 70 cm-wide folded film part, and wherein the film thus arranged is wound up around a tubular core in the direction perpendicular to the lengthwise direction of the film.

* * * * *